2,956,031
HIGHLY CROSS-LINKED NON-FLAMMABLE POLYURETHANE COMPOSITIONS AND PREPARATION OF SAME

Antoine Khawam, East Orange, N.J., assignor to Allied Chemical Corporation, a corporation of New York No Drawing. Filed Apr. 4, 1958, Ser. No. 726,327

10 Claims. (Cl. 260—2.5)

This invention relates to the production of polyurethanes and more particularly refers to new and novel extensively cross-linked polyurethane compositions possessing superior physical properties.

My application Serial No. 726,326, filed April 4, 1958, entitled "Improved Highly Cross-Linked Polyurethane Compositions," is directed to the use of novel tetrahydroxy polyfunctional basic alcohols for the production of highly cross-linked polyurethane compositions. The present invention is particularly directed to the production of cellular polyurethane materials in which a large proportion of an organic plasticizer is incorporated involving the use of certain polyfunctional agents containing two tertiary amino groups and three hydroxyl groups.

In industry it is important to provide polyurethane compositions with a high degree of flexibility and resilience and also fire retardant properties. This may be accomplished by the incorporation of large amounts, at least 5% and more generally 10 to more than 30%, of organic plasticizers including flame retardant plasticizers in the polyurethane composition. Unfortunately, the incorporation of such large amounts of plasticizers, particularly fire retardant plasticizers, is detrimental to the isocyanate (foam-forming) reaction as well as to many important properties of the foam, notably dimensional stability and heat resistance. The flame retardant tends to migrate in the foam, causing gradual shrinkage and distortion of shape, which are greatly accelerated when the foam is subjected to elevated temperatures.

An object of the present invention is to provide a method for the production of cellular polyurethane materials containing large amounts of plasticizer characterized by superior strength, dimensional stability and heat resistance. Another object is to provide nonflammable polyurethane foams in which the flame retardant does not migrate in the foam and which is resistant to shrinkage and distortion even when subjected to elevated temperatures. Other objects and advantages of the present invention will be apparent from the following description.

In accordance with the present invention superior highly cross-linked polyurethane compositions containing large amounts of plasticizer may be obtained by reaction of an organic polyisocyanate and a polyol, e.g. a polyester or polyether containing reactive terminal groups, such as hydroxyl, preferably a polyester, and a diamine trihydroxy compound having the formula:

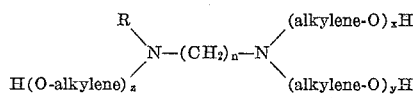

wherein $n$ is a whole number from 1 to 10, preferably 2 or 3, alkylene means a divalent saturated aliphatic hydrocarbon radical containing 2 or 3 carbon atoms, $x$, $y$ and $z$ are whole numbers and the sum of $x$, $y$, $z$ is from 3 to 12, at least two of the (alkylene-O)$_{x, y, z}$—H groups contain primary alcoholic hydroxyl groups and R is an alkyl group containing from 10 to 20 carbon atoms and is preferably derived from soya or coco amines, said diamine trihydroxy compound constituting from 0.1% to 30% preferably from 7% to 15% by weight based on the weight of polyol, said organic polyisocyanate being employed in an amount such that there is an excess of available isocyanate groups over the total number of hydroxyl groups from the polyol and the diamine trihydroxy compound and an organic plasticizer in an amount of 5% to 50% preferably 10 to 30% by weight of the polyol, organic polyisocyanate and diamine trihydroxy compound. The reaction may be carried out in the presence of other known additives such as accelerators, dispersing or emulsifying agents, fillers and water to provide polyurethane products having modified characteristics.

A variety of organic polyisocyanates may be used in the processes of the present invention though diisocyanates are preferred for many formulations. Suitable organic polyisocyanates are arylene diisocyanates such as phenylene diisocyanates, tolylene diisocyanates (or isomeric mixtures thereof), naphthylene diisocyanates, 4,4'-diphenylmethane diisocyanate, etc., or triisocyanates obtained by the reaction of three moles of an arylene diisocyanate with one mole of a triol, for example, the reaction products from three moles tolylene diisocyanate reacting with one mole hexanetriol or trimethylolpropane.

The polyol starting material may be a hydroxyl group containing polyether or polyester including fatty acid glycerides. Polyesters are obtained by esterification condensation reaction of an aliphatic dibasic carboxylic acid with a glycol or triol or mixture thereof in such proportions that the resultant polyesters possess predominantly terminal hydroxyl groups. Aliphatic dibasic carboxylic acids for preparing polyesters are such as adipic acid, fumaric acid, sebacic acid, phthalic acid and suitable alcohols include ethylene glycol, diethylene glycol, trimethylol propane etc. The fatty acid glycerides are those having a hydroxyl number of at least about 50 such as castor oils and hydrogenated castor oils or blown natural oils. Polyethers include polyalkylene glycols, e.g. polyethylene glycols, polypropylene glycols having a molecular weight of at least 200.

For making polyurethane materials, the aforesaid components are allowed to interact in the presence of suitable accelerators, dispersing agents, water etc. to produce the desired material. If the reaction is carried out in the presence of water a cellular polyurethane material results. When utilizing fatty acid glycerides, the polyisocyanate is generally first reacted with the glyceride optionally in the presence of an additive such as fine particulate silica to form a prepolymer which is then reacted with the diamine trihydroxy compound. When employing polyesters, i.e. alkyd resin type, the "one-shot" method is used to produce foamed materials and the reaction may be carried out in the presence of additional accelerators, other than the diamine trihydroxy compound of the invention, depending on the density desired.

The foams may be prepared in the usual manner by admixing and introducing into a mold the components composed of a polyester, polyisocyanate, water in the presence of the diamine trihydroxy compound as cross-linking agent. Ordinarily the polyisocyanate being admixed is in an amount of at least 30%, and may be as high as 300% or more by weight of the polyester. The water should be in an amount enough to react with the isocyanate to liberate sufficient gas to produce a foam of the desired physical characteristics. From 0.5% to 10% water based on the weight of isocyanate will generally give good results. The mixing of the constituents may be carried out at an elevated temperature or under atmospheric conditions.

The preferred emulsifiers are of the non-ionic type, such as a monoether of a polyethylene glycol with an alkyl phenol, blends of poly alcohol carboxylic acid esters and oil soluble sulfonate ("Witco 77"), polyethylene glycol ricinoleate ("Emulphor EL-719"), sorbitan monolaurate ("Span 20"), and polyoxy alkylene derivatives or sorbitan monolaurate (e.g. "Tween 20" and "Tween 80"). Anionic emulsifiers such as sodium dioctyl sulfosuccinate may also be used. In general the amount of emulsifier required does not exceed 10% based on the polyester.

Prepolymers may be prepared by first reacting the diisocyanate with the polyester in the absence of water to form a prepolymer. In the preparation of polyurethane foam, the new diamine trihydroxy cross-linking agent and dispersing agent may first be dissolved in water and this solution added to the prepolymer preferably at room temperature, and the resultant mixture agitated vigorously for a short time, usually less than a minute, and then poured into a mold. Foaming will start immediately. The rate of foaming may be increased considerably by heating the prepolymer prior to addition of catalyst mixture.

The diamine trihydroxy compounds of the invention have sufficient basic character to act as catalysts for the polyisocyanate reaction with the hydroxyl groups. The density of the cellular polyurethane products of the invention can be regulated by the incorporation of additional catalysts or accelerators, as well as by altering the composition of the initial polyol or the degree of polymerization of the prepolymer (the latter is determined by the viscosity of the prepolymer). Suitable additional accelerators are organic tertiary amines such as N-alkyl morpholines, trialkylamines and N-dialkyl piperazines.

The amount of diamine trihydroxy compound, of the type defined hereinbefore, utilized in the process of the present invention may be varied over a wide range. When used in a prepolymer formulation, such as a fatty acid glyceride "prepolymer" the amount employed may be in the range of from 0.1% to 30%, preferably from 7% to 15%, by weight based on the weight of the polyol, e.g. fatty acid glyceride. When the diamine trihydroxy compound is employed with a polyether or a polyester of the alkyd resin type, the amount used may be in the range of from 0.1% to 30%, preferably from 7% to 15%, by weight based on the weight of polyol.

The amount of organic polyisocyanate used in such that there is an excess of isocyanate groups over the total number of hydroxyl groups available from the polyol and the diamine trihydroxy compound.

The invention permits the production of foams of low density, i.e. between 0.5 and about 5 lbs. per cu. ft. characterized by superior strength and dimensional stability.

The present invention is particularly valuable for preparing superior foams containing fire retardant plasticizers.

One of the major deficiencies of polyesterurethane foams is their flammability. This can be overcome by incorporation into the foam of well known flame retardants, usually chlorinated phosphate esters, e.g. tris β-chloroethyl phosphate, tris chloropropyl phosphate, or esters of organic phosphonic acids, e.g. diallyl styrene phosphonate, diallyl phenyl phosphonate, diallyl toluene phosphonate, esters (e.g. diethyl, dibutyl esters), of halogenated organic acids, e.g. tetrachlorophthalic acid, dibromosuccinic, etc. To achieve a marked improvement in fire-resisting properties it is generally necessary to add at least about 5% and preferably at least 10% of flame retardant based on the total weight of the foam ingredients. However, the incorporation of such large amounts of fire retardant is detrimental to the isocyanate (foam-forming) reaction as well as to many important properties of the foam, notably dimensional stability and heat resistance. Thus, the flame retardant tends to migrate in the foam, causing gradual shrinkage and distortion of shape, which are greatly accelerated when the foam is subjected to elevated temperatures.

The foregoing deficiencies can be overcome and superior foams containing substantial amounts of fire retardant can be obtained by use of the diamine trihydroxy compound. Although certain diamine compounds of this type have been suggested as catalysts, I have found surprisingly that the use of diamine trihydroxy compounds of the present invention when used as a cross-linking agent in polyurethane compositions containing large amounts of plasticizers, the size of the macromolecule is considerably increased, producing a highly complex structure which is able to hold in place the comparatively small molecule of flame retardant. Further, when halogenated flame retardants are used, the basic tertiary nitrogen atoms of the cross-linking agents act as halogen scavengers, thereby improving the stability of the foam.

Nonfire retardant plasticizers, e.g. dibutyl phthalate, may be employed in formulations of the present invention. However, an advantage of the present invention is that the cross-linking agents constitute plasticizers, which are chemically bonded to the polyurethane plastic and hence reduce the amount of additional plasticizer required.

The more detailed practice of the invention is illustrated by the following examples, in which parts given are by weight and temperature in degrees centigrade.

EXAMPLE 1

*Preparation of prepolymer*

35 parts fine particulate silica (G. L. Cabot, Cab-o-Sil average particle 0.015 to 0.02 micron diameter, dry bulk density 2.5–3.5 lbs. per cu. ft.) were dispersed in 1300 parts tolylene diisocyanate ("Nacconate 80," 80% 2,4-isomer, 20% 2,6-isomer) and the resultant mixture was slowly addded with constant agitation to 1800 parts castor oil (Baker's Grade AA, hydroxyl No. 163) so that the temperature of the reaction mixture did not exceed 85°. The reaction mixture was then heated to 135° for one hour and cooled to room temperature. The cooled prepolymer thus obtained should have a viscosity in the range of 40,000–70,000 centipoises at 25°. In the absence of moisture and activators the prepolymer can be stored for several months.

*Production of cellular material*

300 parts of the prepolymer was plasticized with 90 parts castor oil (Baker's Grade AA, hydroxyl No. 163); this mix has a working life of from one to two hours. To the plasticized prepolymer, thus obtained, there was added rapidly with efficient stirring 12 parts aqueous catalyst-dispersing agent mixture (100 parts water, 50 parts diethylethanolamine and 50 parts "Triton X-100," nonionic dispersing agent) and 30 parts N-coco-N,N',N'-tris-(2-hydroxyethyl)-ethylenediamine (Armour Chem. Div., Armour & Co.), mixing was continued for less than 20 seconds when the foaming mass was poured into molds. The foam was allowed to expand freely, curing being completed at room temperature.

The fully cured foam had a density of 6 to 7 lbs. per cu. ft., a compression set of 3%, compression resistance modulus of 28 p.s.i., was semi-rigid and possessed an extremely fine, uniform cell structure. This type of foam is particularly well suited for shock absorption applications such as the production of crash pads, carpet underlays, etc.

EXAMPLE 2

300 parts of the prepolymer prepared by the method in Example 1 was mixed with 90 parts castor oil, then an aqueous mixture consisting of 30 parts N-coco-N,N',N'-tris-(2-hydroxyethyl)-ethylenediamine, 3 parts dispersing agent ("Witco 77–86," blend of poly alcohol carboxylic acid esters and oil soluble sulfonates) and 6 parts water was rapidly stirred in to produce a foaming mass in about 20 seconds. The reaction mass was poured into molds, allowed to expand freely and cured at room temperature for 24 hours.

The resultant fine celled polyurethane foam had a density of about 9 lbs. per cu. ft., a compression set of 4% and a compression resistance modulus of 28 p.s.i.

EXAMPLE 3

100 parts of the prepolymer prepared by the method in Example 1 was mixed with 30 parts castor oil, then reacted with a mixture of 10 parts N-coco-N,N',N'-tris-(2-hydroxyethyl)-ethylenediamine, 2 parts water and 1 part dispersing agent ("Tween 21," a polyoxyalkylene derivative of sorbitan monolaurate) according to the procedure outlined in Example 1.

Th semi-rigid polyurethane foam so obtained had a density of 10.8 lbs. per cu. ft., a resilience of 9.7% and a fine uniform cell structure.

EXAMPLE 4

A semi-rigid foam containing a large amount of a fire retardant plasticizer, for example tris-(2-chloroethyl) phosphate was prepared in the following manner:

An emulsion was prepared by thoroughly mixing 100 parts of polyester (obtained by reaction of trimethylolpropane with adipic acid; having a hydroxyl No. in the range of 465–495 and an acid No. in the range of 15–20), 50 parts tris-(2-chloroethyl) phosphate ("Celluflex CEF"), 10 parts water, 1 part N-methyl morpholine, 2 parts N-coco-N,N',N'-tris-(2-hydroxyethyl)-ethylenediamine and 1.5 parts non-ionic wetting agent ("Witco 77–86"). To this emulsion there was added a modified diisocyanate (tolylene diisocyanate "Nacconate 80," 80% 2,4-isomer and 20% 2,6-isomer reacted with 10% by weight of 1,2,6-hexanetriol to give a product of amine equivalent of about 120); the reaction mixture was stirred for about 35 seconds before pouring. The reaction mass was poured into a wooden panel sandwich structure which was clamped in a jig, whereby foaming took place in a confined space under a slight restraining pressure. The foam cure was completed in an air oven at 80°.

The foams produced in this manner are characterized by low density (1.7 to 1.9 lbs. per cu. ft.), good dimensional stability, heat resistance, absence of shrinkage on heating to 110° for 24 hours and non-migration of the flame retardant plasticizer.

The use of the diamine trihydroxy compounds as additives in the curing of polyisocyanates and polyesters containing hydroxyl groups causes the rapid production of highly cross-linked macromolecular products. The exceptional cross-linking made possible by the incorporation of these new polyfunctional highly reactive additives results in a greatly increased viscosity so that cellular polyurethane materials can be produced from low viscosity prepolymers without subsequent collapse or shrinkage on curing. The new polyurethanes possess exceptional compression strength, heat and abrasion resistance as well as dimensional stability.

Although certain preferred embodiments of the invention have been disclosed for purpose of illustration, it will be evident that various changes and modifications may be made therein without departing from the scope and spirit of the invention.

I claim:

1. A highly cross-linked polyurethane composition produced by reaction of an organic polyisocyanate and a polyol selected from the group consisting of an esterification product of a dicarboxylic acid and a polyhydric alcohol, a fatty acid glyceride having a hydroxyl number of at least 50 and a polyalkylene ether glycol having a molecular weight of at least 200 and a diamine trihydroxy compound having the formula:

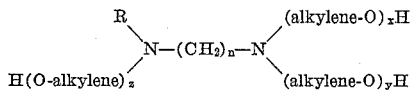

wherein $n$ is a whole number from 1 to 10, alkylene means a divalent saturated aliphatic hydrocarbon radical containing 2 to 3 carbon atoms, $x$, $y$ and $z$ are whole numbers and the sum of $x$, $y$ and $z$ is from 3 to 12, at least two of the groups selected from the groups consisting of (alkylene-O)$_x$—H, (alkylene-O)$_y$—H and (alkylene-O)$_z$—H contain primary alcoholic hydroxyl groups and R is an alkyl group containing from 10 to 20 carbon atoms, said diamine trihydroxy compound constituting from 0.1% to 30% by weight based on the weight of polyol, said organic polyisocyanate being employed in an amount such that there is an excess of available isocyanato groups over the total number of hydroxyl groups from the polyol and the diamine trihydroxy compound, and an organic flame retardant selected from the group consisting of chlorinated phosphate esters, esters of organic phosphonic acids and esters of halogenated organic acids in an amount of 5% to 50% by weight of the polyol, organic polyisocyanate and diamine trihydroxy compound.

2. A highly cross-linked polyurethane composition containing dibutyl phthalate in an amount of 10% to 30% by weight of the polyol, organic polyisocyanate and diamine trihydroxy compound hereinafter defined, produced by reaction of an organic polyisocyanate and a polyol selected from the group consisting of an esterification product of a dicarboxylic acid and a polyhydric alcohol, a fatty acid glyceride having a hydroxyl number of at least 50 and a polyalkylene ether glycol having a molecular weight of at least 200 and a diamine trihydroxy compound having the formula:

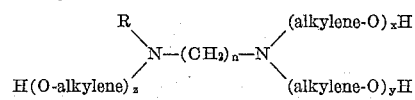

wherein $n$ is a whole integer from 2 to 3, alkylene means a divalent saturated aliphatic hydrocarbon radical containing 2 to 3 carbon atoms, $x$, $y$ and $z$ are whole numbers and the sum of $x$, $y$, $z$ is from 3 to 12, at least two of the groups selected from the groups consisting of (alkylene-O)$_x$—H, (alkylene-O)$_y$—H and (alkylene-O)$_z$—H contain primary alcoholic hydroxyl groups and R is an alkyl group containing from 10 to 20 carbon atoms, said diamine trihydroxy compound constituting from 0.1% to 30% by weight based on the weight of polyol, said organic polyisocyanate being employed in an amount such that there is an excess of available isocyanato groups over the total number of hydroxyl groups from the polyol and the diamine trihydroxy compound, and an organic fire retardant selected from the group consisting of chlorinated phosphate esters, esters of organic phosphonic acids and esters of halogenated organic acids in an amount of 5% to 50% by weight of the polyol, organic polyisocyanate and diamine trihydroxy compound.

3. A highly cross-linked polyurethane composition produced by reaction of an organic polyisocyanate and a polyester which is the esterification product of a dicarboxylic acid and a polyhydric alcohol and a diamine trihydroxy compound having the formula:

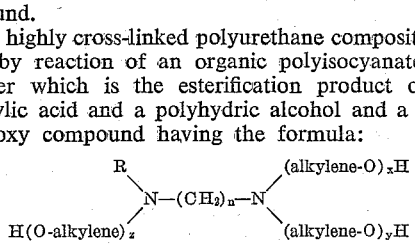

wherein $n$ is a whole integer from 2 to 3, alkylene means a divalent saturated aliphatic hydrocarbon radical containing 2 to 3 carbon atoms, $x$, $y$ and $z$ are whole numbers and the sum of $x$, $y$, $z$ is from 3 to 12, at least two of the groups selected from the groups consisting of (alkylene-O)$_x$—H, (alkylene-O)$_y$—H and (alkylene-O)$_z$—H contain primary alcoholic hydroxyl groups and R is an alkyl group containing from 10 to 20 carbon atoms, said diamine trihydroxy compound constituting from 7% to 15% by weight based on the weight of polyester, said organic polyisocyanate being employed in an amount such that there is an excess of available isocyanato groups over the total number of hydroxyl groups from the polyester and the diamine trihydroxy compound, and an organic flame retardant selected from the group consisting of chlorinated phosphate esters, esters of organic phosphonic acids and esters of halogenated organic acids in an amount of 10% to 30% by weight of the polyester, organic polyisocyanate and diamine trihydroxy compound.

4. A highly cross-linked polyurethane composition produced by reaction of an organic polyisocyanate and a polyalkylene ether glycol having a molecular weight of at least 200 and a diamine trihydroxy compound having the formula:

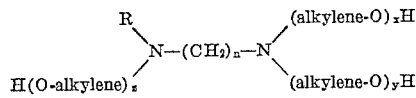

wherein $n$ is a whole integer from 2 to 3, alkylene means a divalent saturated aliphatic hydrocarbon radical containing 2 to 3 carbon atoms, $x$, $y$ and $z$ are whole numbers and the sum of $x$, $y$, $z$ is from 3 to 12, at least two of the groups selected from the groups consisting of (alkylene-O)$_x$—H, (alkylene-O)$_y$—H and (alkylene-O)$_z$—H contain primary alcoholic hydroxyl groups and R is an alkyl group containing from 10 to 20 carbon atoms, said diamine trihydroxy compound constituting from 7% to 15% by weight based on the weight of polyalkylene ether glycol, said organic polyisocyanate being employed in an amount such that there is an excess of available isocyanato groups over the total number of hydroxyl groups from the polyalkylene ether glycol and the diamine trihydroxy compound, and an organic flame retardant selected from the group consisting of chlorinated phosphate esters, esters of organic phosphonic acids and esters of halogenated organic acids in an amount of 10% to 30% by weight of the polyalkylene ether glycol organic polyisocyanate and diamine trihydroxy compound.

5. A highly cross-linked polyurethane composition having fire retardant properties as claimed in claim 14 in which the polyol is a polyester of trimethylolpropane and adipic acid, the diamine trihydroxy compound is N-coco-N,N',N'-tris-(2-hydroxyethyl)-ethylenediamine the polyisocyanate is a triisocyanate from the reaction of 3 moles tolylene diisocyanate with 1 mole hexanetriol, and the organic fire retardant is tris-(2-chloroethyl) phosphate.

6. A process for the production of highly cross-linked polyurethane compositions which comprises reacting an organic polyisocyanate and a polyol selected from the group consisting of an esterification product of a dicarboxylic acid and a polyhydric alcohol, a fatty acid glyceride having a hydroxyl number of at least 50 and a polyalkylene ether glycol having a molecular weight of at least 200 and a diamine trihydroxy compound having the formula:

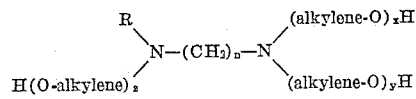

wherein $n$ is a whole number from 1 to 10, alkylene means a divalent saturated aliphatic hydrocarbon radical containing 2 to 3 carbon atoms, $x$, $y$ and $z$ are whole numbers and the sum of $x$, $y$ and $z$ is from 3 to 12, at least two of the groups selected from the groups consisting of (alkylene-O)$_x$—H, (alkylene-O)$_y$—H and (alkylene-O)$_z$—H contain primary alcoholic hydroxyl groups and R is an alkyl group containing from 10 to 20 carbon atoms, said diamine trihydroxy compound constituting from 0.1% to 30% by weight based on the weight of polyol, said organic polyisocyanate being employed in an amount such that there is an excess of available isocyanato groups over the total number of hydroxyl groups from the polyol and the diamine trihydroxy compound, and an organic flame retardant selected from the group consisting of chlorinated phosphate esters, esters of organic phosphonic acids and esters of halogenated organic acids in an amount of 5% to 50% by weight of the polyol, organic polyisocyanate and diamine trihydroxy compound.

7. A process for the production of highly cross-linked polyurethane compositions which comprises reacting an organic polyisocyanate and a polyol selected from the group consisting of an esterification product of a dicarboxylic acid and a polyhydric alcohol, a fatty acid glyceride having a hydroxyl number of at least 50 and a polyalkylene ether glycol having a molecular weight of at least 200 and a diamine trihydroxy compound having the formula:

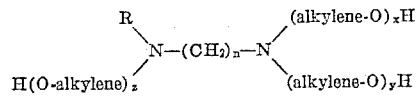

wherein $n$ is a whole integer from 2 to 3, alkylene means a divalent saturated aliphatic hydrocarbon radical containing 2 to 3 carbon atoms, $x$, $y$ and $z$ are whole numbers and the sum of $x$, $y$, $z$ is from 3 to 12, at least two of the groups selected from the groups consisting of (alkylene-O)$_x$—H, (alkylene-O)$_y$—H and (alkylene-O)$_z$—H contain primary alcoholic hydroxyl groups and R is an alkyl group containing from 10 to 20 carbon atoms, said diamine trihydroxy compound constituting from 0.1% to 30% by weight based on the weight of polyol, said organic polyisocyanate being employed in an amount such that there is an excess of available isocyanato groups over the total number of hydroxyl groups from the polyol and the diamine trihydroxy compound, and an organic fire retardant selected from the group consisting of chlorinated phosphate esters, esters of organic phosphonic acids and esters of halogenated organic acids in an amount of 5% to 50% by weight of the polyol, organic polyisocyanate and diamine trihydroxy compound.

8. A process for the production of highly cross-linked polyurethane compositions which comprises reacting an organic polyisocyanate and a polyester which is the esterification product of a dicarboxylic acid and a polyhydric alcohol and a diamine trihydroxy compound having the formula:

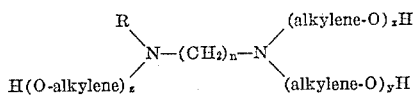

wherein $n$ is a whole integer from 2 to 3, alkylene means a divalent saturated aliphatic hydrocarbon radical containing 2 to 3 carbon atoms, $x$, $y$ and $z$ are whole numbers and the sum of $x$, $y$, $z$ is from 3 to 12, at least two of the groups selected from the groups consisting of (alkylene-O)$_x$—H, (alkylene-O)$_y$—H and (alkylene-O)$_z$—H contain primary alcoholic hydroxyl groups and R is an alkyl group containing from 10 to 20 carbon atoms, said diamine trihydroxy compound constituting from 7% to 15% by weight based on the weight of polyester, said organic polyisocyanate being employed in an amount such that there is an excess of available isocyanato groups over the total number of hydroxyl groups from the polyester and the diamine trihydroxy compound, and an organic flame retardant selected from the group consisting of chlorinated phosphate esters, esters of organic phosphonic acids and esters of halogenated organic acids in an amount of 10% to 30% by weight of the polyester, organic polyisocyanate and diamine trihydroxy compound.

9. A process for the production of highly cross-linked polyurethane compositions which comprises reacting an organic polyisocyanate and a polyalkylene ether glycol having a molecular weight of at least 200 and a diamine trihydroxy compound having the formula:

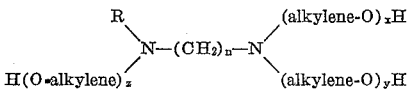

wherein $n$ is a whole integer from 2 to 3, alkylene means a divalent saturated aliphatic hydrocarbon radical containing 2 to 3 carbon atoms, $x$, $y$ and $z$ are whole numbers and the sum of $x$, $y$, $z$ is from 3 to 12, at least two of the groups selected from the groups consisting of (alkylene-O)$_x$—H, (alkylene-O)$_y$—H and (alkylene-O)$_z$—H contain primary alcoholic hydroxyl groups and R is an alkyl group containing from 10 to 20 carbon atoms, said diamine trihydroxy compound constituting from 7% to 15% by weight based on the weight of polyalkylene ether glycol, said organic polyisocyanate being employed in an amount such that there is an excess of available isocyanato groups over the total number of hydroxyl groups from the polyalkylene ether glycol and the diamine trihydroxy compound, and an organic flame retardant selected from the group consisting of chlorinated phosphate esters, esters of organic phosphonic acids and esters of halogenated organic acids in an amount of 10% to 30% by weight of the polyalkylene ether glycol, organic polyisocyanate and diamine trihydroxy compound.

10. A method of producing highly cross-linked cellular polyurethane compositions which comprises reacting by simultaneously mixing a polyol selected from the group consisting of an esterification product of a dicarboxylic acid and a polyhydric alcohol, a fatty acid glyceride having a hydroxyl number of at least 50 and a polyalkylene ether glycol having a molecular weight of at least 200, an organic polyisocyanate and a diamine trihydroxy compound having the formula:

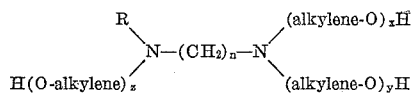

wherein $n$ is a whole number from 1 to 10, alkylene means a divalent saturated aliphatic hydrocarbon radical containing 2 to 3 carbon atoms, $x$, $y$ and $z$ are whole numbers and the sum of $x$, $y$, $z$ is from 3 to 12, at least two of the groups selected from the groups consisting of (alkylene-O)$_x$—H, (alkylene-O)$_y$—H and (alkylene-O)$_z$—H contain primary alcoholic hydroxyl groups and R is an alkyl group containing from 10 to 20 carbon atoms, said diamine trihydroxy compound constituting from 0.1% to 30% by weight based on the weight of polyol, said organic polyisocyanate being employed in an amount such that there is an excess of available isocyanato groups over the total number of hydroxyl groups from the polyol and the diamine trihydroxy compound, water and an organic flame retardant selected from the group consisting of chlorinated phosphate esters, esters of organic phosphonic acids and esters of halogenated organic acids in an amount of 5% to 50% by weight of the polyol, organic polyisocyanate and diamine trihydroxy compound.

References Cited in the file of this patent

UNITED STATES PATENTS

| 2,577,281 | Simon et al. | Dec. 4, 1951 |
| 2,764,565 | Hoppe et al. | Sept. 25, 1956 |
| 2,811,493 | Simon et al. | Oct. 29, 1957 |

FOREIGN PATENTS

| 733,624 | Great Britain | July 13, 1955 |